US009268731B2

(12) United States Patent
Feekes

(10) Patent No.: US 9,268,731 B2
(45) Date of Patent: Feb. 23, 2016

(54) CONTROLLING DEVICES VIA ADVANCE NOTICE SIGNALING

(75) Inventor: Dannie Feekes, Eldorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 645 days.

(21) Appl. No.: 13/345,647

(22) Filed: Jan. 6, 2012

(65) Prior Publication Data
US 2013/0179612 A1 Jul. 11, 2013

(51) Int. Cl.
*G06F 13/42* (2006.01)
(52) U.S. Cl.
CPC ...................... *G06F 13/42* (2013.01)
(58) Field of Classification Search
CPC .......................................... G06F 13/42
USPC ................................. 713/320, 324
See application file for complete search history.

(56) References Cited

U.S. PATENT DOCUMENTS

| 2005/0128973 | A1* | 6/2005 | Yagihashi ...................... 370/328 |
| 2007/0079044 | A1* | 4/2007 | Mandal et al. ................ 710/310 |
| 2009/0259861 | A1* | 10/2009 | Tune ............................. 713/320 |
| 2009/0292935 | A1* | 11/2009 | Hallnor et al. ................ 713/323 |
| 2012/0039174 | A1* | 2/2012 | Robin et al. ................ 370/235.1 |
| 2012/0047214 | A1* | 2/2012 | Daly et al. .................... 709/206 |
| 2012/0284537 | A1* | 11/2012 | Kruglick ....................... 713/300 |
| 2013/0111242 | A1* | 5/2013 | Heller et al. .................. 713/323 |

* cited by examiner

*Primary Examiner* — Nimesh G Patel
(74) *Attorney, Agent, or Firm* — Grossman, Tucker, Perreault & Pfleger, PLLC

(57) ABSTRACT

Generally this disclosure describes methods and systems for controlling device operation in a processing system. A method may include receiving information comprising at least one packet, identifying the information as associated with a device based on a header in the at least one packet and transmitting a signal to the device, the signal being configured to provide advance notice to the device that the information is being scheduled for transmission to the device. Another method may include receiving a signal configured to provide advance notice of information that will be received, transitioning from a first operational state to a second operational state and receiving the information.

30 Claims, 8 Drawing Sheets

CONTROLLING DEVICES VIA ADVANCE NOTICE SIGNALING

FIELD

This disclosure relates to device control, and, more particularly, to a system and method for controlling the operational state of devices in a processing system.

BACKGROUND

A processing system (e.g., storage server, desktop computer, laptop computer, notebook computer, ultrabook, netbook, tablet computer, smartphone, mobile handset or other processor-based system) may include functionality configured to help the system conserve power, avoid heat buildup, reduce communication congestion, etc. As an example, power may be conserved by altering the operational state of devices that are not being used by the system. System devices that become inactive may enter a low power state wherein some or all of the device features are shut down. An inactive device may then reactivate when it recognizes that tasks are waiting to be performed. However, device reactivation necessarily includes a certain amount of latency (e.g., devices cannot reactivate instantaneously, and thus, there is some delay before the device is ready to perform its function). Latency may be problematic when the tasks to be performed are time-sensitive, which can negatively impact the overall performance of the processing system.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
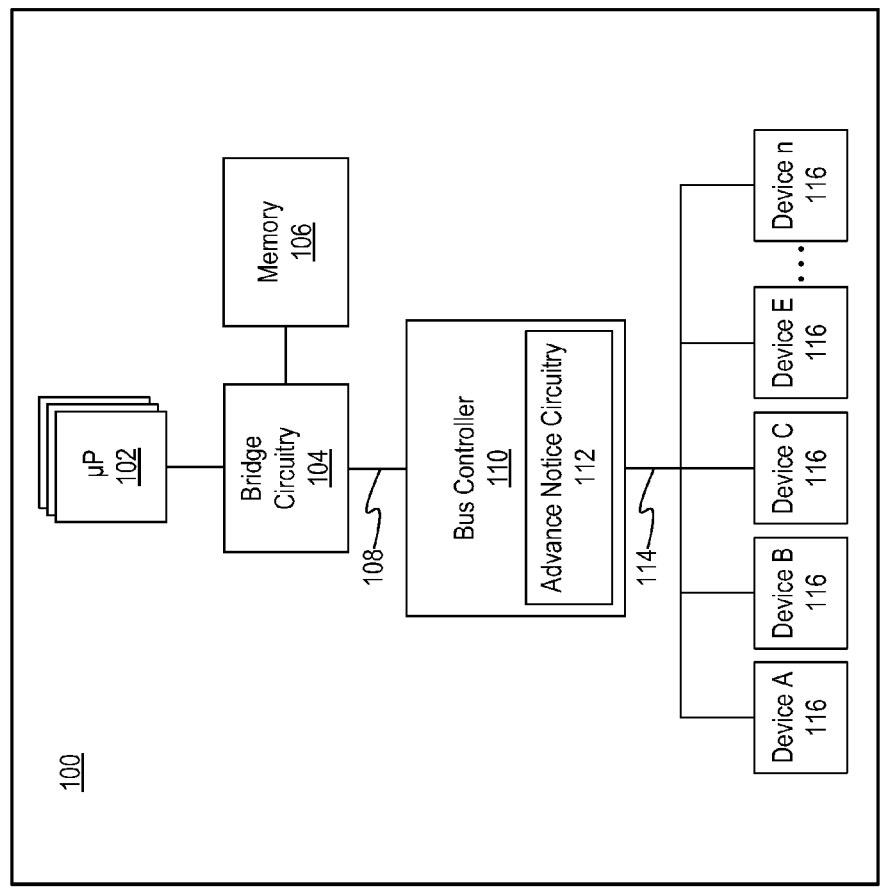
FIG. 1 illustrates an example system in accordance with various embodiments.

Although the following Detailed Description will proceed with reference being made to illustrative embodiments, many alternatives, modifications and variations thereof will be apparent to those skilled in the art.

DETAILED DESCRIPTION

Generally, this disclosure describes systems and methods for controlling device operation in a processing system. The processing system may include a bus controller. The bus controller is configured to receive information intended for devices on the bus, the information comprising at least one packet. To determine how to route the information, the bus controller is configured to decode a header in the at least one packet. The header informs the bus controller of the device to receive the information. In one embodiment, the bus controller may then transmit a signal to the device, the signal being configured to provide advance notice that the information is being scheduled for transmission. After receiving the signal, the device may prepare to receive the information. Preparation may include, for example, the device transitioning from a low power operational state to an operational state wherein the device is ready to process the information. The information may then be scheduled for transmission and transmitted to the device.

In one embodiment the bus controller may also be configured to determine whether the information is ready to transmit. For example, in some instances the information may include intermittent short-message traffic. Transmitting this information to the device as it is received will cause the device to thrash between operational states, resulting in inefficient operation. To avoid this behavior, the bus controller may cause the information to be stored in a buffer until a predetermined threshold is met. The predetermined threshold may be based on, for example, a latency limit associated with the information (e.g., how long the information can wait to be processed), an amount of information, whether the information is complete (e.g., whether some of the information is still en route to the bus controller), etc. After the bus controller determines that the information in the buffer is ready to transmit, the signal providing advance notice to the device may be transmitted, and the information may then be scheduled/transmitted to the device.

In the same or a different embodiment, the bus controller may further be configured to determine characteristics corresponding to the information. For example, the characteristics may be associated with the information itself (e.g., size, type, etc.) or functionality to be performed by a device after receiving the information (e.g., initialization, configuration, standard operation, etc). The signal providing advance notice may then be configured based on the characteristics. A device that receives the signal may also be configured to determine the characteristics based on the signal. The device may then transition from a low power operational state to a partially active operational state based on the characteristics. In particular, the device may only activate the features of the device that are needed to process the information based on the characteristics.

FIG. 1 illustrates a system 100 that is consistent with various embodiments of the present disclosure. System 100 may be a processing system such as, but not limited to, a storage server, desktop computer, laptop computer, notebook computer, ultrabook, netbook, tablet computer, smartphone, mobile handset or other processor-based system. System 100 includes processor 102. Processor 102 comprises one or more microprocessors (in the same integrated circuit (IC) package or in separate IC packages), and each of the one or more microprocessors may include one or more processing cores configured to execute instructions. The instructions may cause processor 102 to execute operations alone or in combination with other devices in system 100. Example processors include Intel Pentium, Xeon, Itanium, Celeron, Atom, Core i-series, etc. Processor 102 may also include other devices configured to process data aside from traditional microprocessors, such as coprocessors, video and/or audio processors, microengines (ME), etc.

Processor 102 may interact with other devices in system 100 via bridge circuitry 104. Bridge circuitry 104 may include one or more logic chipsets (e.g., groups of ICs) configured to handle communications between processor 102, memory 106 and the devices communicating on bus 108. In particular, bridge circuitry 104 may be configured to handle the signaling between the devices by converting from one type/speed of signaling to another, and may be configured to be compatible with a variety of different devices to allow for different system implementations, upgrades, etc. Some of the functionality that is commonly associated with bridge circuitry 104 may also be incorporated within processor 102, memory 104 or other system devices.

Memory 106 is configured to store information for use in system 100, and may comprise random access memory (RAM) and/or read-only memory (ROM) in various configurations. For example, RAM may include individual ICs, single in-line memory modules (SIMM), dual in-line memory modules (DIMM), etc. that are configured to store information for use by processor 102, typically on a short-term basis (e.g., while system 100 is operating). RAM is available in various types such as Static RAM (SRAM), Dynamic RAM (DRAM), Synchronous DRAM (SDRAM), Video RAM (VRAM), Non-Volatile RAM (NVRAM), etc. ROM may comprise ICs, modules and/or other types of media (e.g., compact discs) from which information is typically read but not rewritten. Some formats of ROM allow information to be rewritten such as Electronically Programmable ROM (EPROM), Electronically Erasable ROM (EEPROM or "Flash"), etc.

Bridge circuitry 104 may also be coupled to bus 108. As referred to herein, a bus may be defined as a communication subsystem configured to transfer data between devices. A bus may be wired or wireless. In one embodiment a bus may be internal or local to a processing system, the bus coupling two or more devices through physical conductors such as signal traces, vias, etc. that may be etched in a motherboard, an integrated circuit (e.g., in a system on chip (SOC)), etc. However, other embodiments are not limited to this configuration. Examples bus technologies include, but are not limited to, Small Computer System Interface (SCSI), Integrated Drive Electronics (IDE), Peripheral Component Interconnect (PCI), Accelerated Graphics Port (AGP), PCI Express (PCIE), HyperTransport (HT), InfiniBand, etc. Devices interacting on a bus may comprise at least one communication module allowing for the transmission and reception of information, signals, etc. In system 100, bus 108 connects bus controller 110 to at least bridge circuitry 104. A second bus 114, possibly operating using a different technology than bus 108, connects bus controller 110 to devices (A-n) 116. In this configuration bus controller 110 may be deemed an "endpoint" since bus controller 110 resides at the end of bus 108 and bus 114 and may provide communication bridging functionality between the two buses. Bus controller 110 may be configured to control communications on bus 114. For example, bus controller 110 may receive information from bus 108 (e.g., from bridging circuitry 104), may determine a destination device to which to transmit the information needs (e.g., to at least one of devices (A-n) 116), and may then transmit the information to the destination via bus 114. Devices (A-n) 116 include any devices capable of communicating on bus 114 such as, but not limited to, video controllers, storage controllers, volatile/nonvolatile memory controllers, wired/wireless network interfaces, peripheral devices, multimedia transceivers, controllers (e.g., power management controllers), user interfaces, etc.

Advance Notice Circuitry

In one embodiment, bus controller 110 includes advance notice circuitry 112. After bus controller 110 receives information and then determines a destination device for the information, advanced notice circuitry 112 may be configured to transmit a signal to the destination device, the signal being configured to provide advanced notice to the device that the information is being scheduled for transmission. The destination device may then be able to prepare for the incoming information by, for example, transitioning from a low power operational state (e.g., power conservation mode) to an active operational state. In this manner, the destination device may be prepared for (e.g., ready to process) the information when it is received from bus controller 110, and any latency caused by the destination device reactivation may be reduced in system 100.

Figure 2:
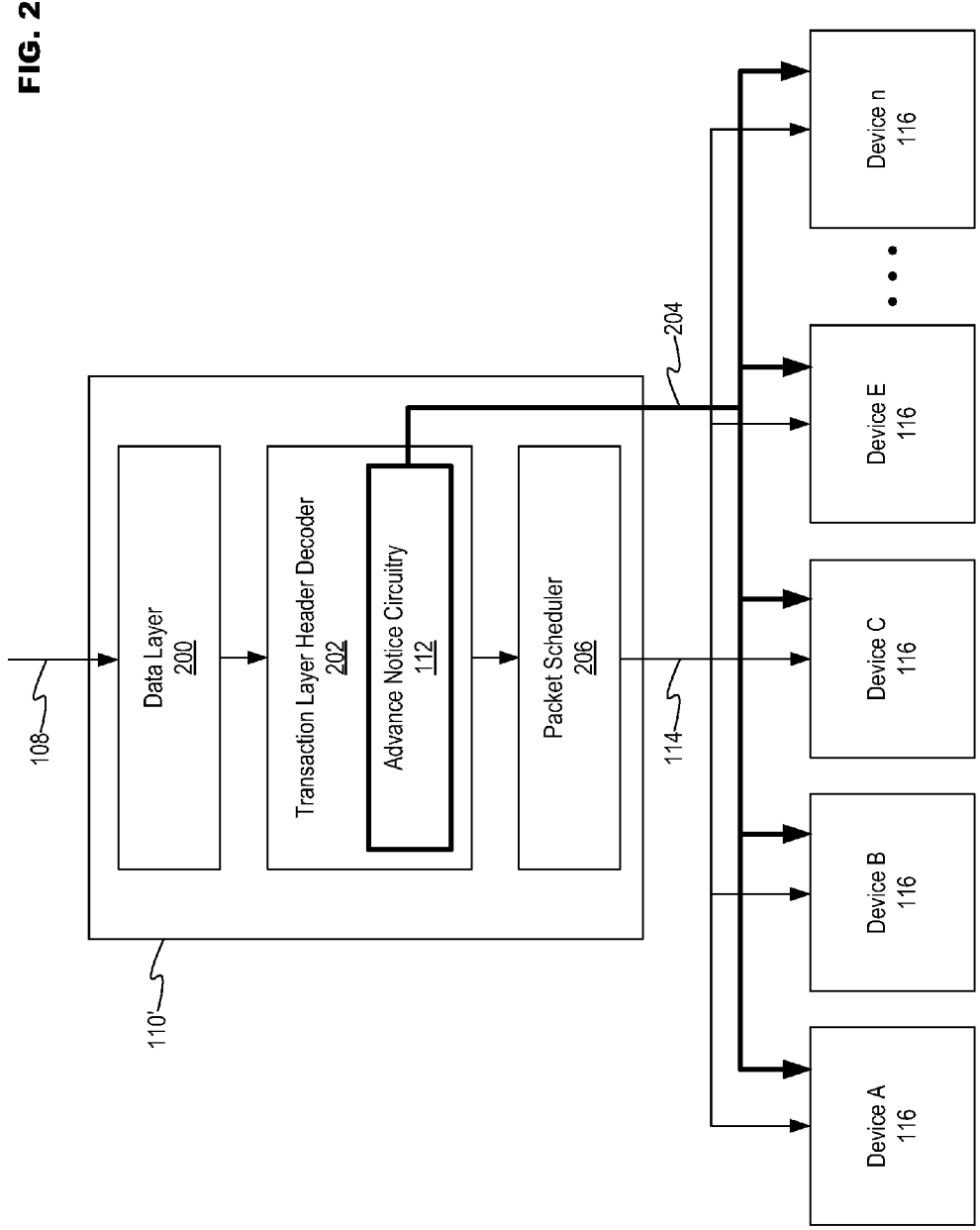
FIG. 2 illustrates an example bus controller including advance notice circuitry in accordance with at least one embodiment.

FIG. 2 illustrates an example bus controller 110' including advance notice circuitry 112 in accordance with at least one embodiment. Bus controller 110' includes at least data layer 200, transaction layer header decoder 202 (comprising advance notice circuitry 112) and packet scheduler 206. Data layer 200 may be configured to receive information into bus controller 110' from bus 108. For example, information coming from bridge circuitry 104 may be received via data layer 200. The received information may then be passed to transaction layer header decoder 202. Transaction layer header decoder 202 may be configured to decode information from at least one packet in the information in order to determine at least one destination device for the information. For example, when communicating on a PCIE bus each transaction layer packet may include a header comprising three to four 32-bit "double words" that include the destination (e.g., a "write address") for the information. The destination may, for example, identify that the information should be transmitted to at least one of devices (A-n) 116. After determining the destination device, advance notice circuitry 112 may transmit signal 204 to the destination device (e.g., via bus 114), signal 204 being configured to provide advance notice to the destination device that the information is being scheduled for transmission or, from the perspective of the destination device, of information that will be received. In one embodiment, signal 204 may be a simple indicator configured to notify the device to transition to an active operational mode. For example, advance notice circuitry 112 may simply set a wake-up bit that is being monitored by the destination device. Signal 204 may also comprise a simple message (e.g., a packet) transmitted to the destination device, or to a power management controller internal or external to the destination device. Signal 204 may cause the destination device to transition into an active operational state. The information may then be passed to packet scheduler 206. Packet scheduler 206 may be configured to schedule the information for transmission to the destination device based on, for example, the relative priority of the information as compared to other scheduled transmissions. The information may then be transmitted to the destination device via bus 114. The destination device should be ready to process the information upon receipt since signal 204 previously caused the destination device to transition to an active operational state.

Figure 3:
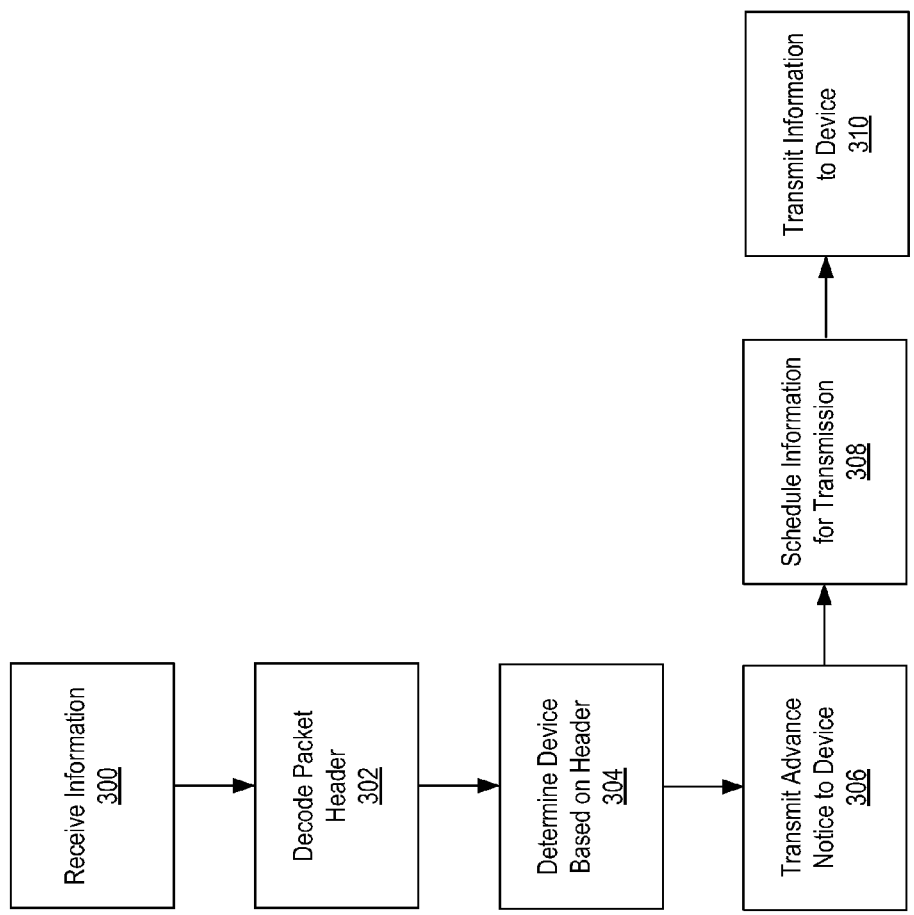
FIG. 3 is a flowchart of example advance notification operations from the perspective of the example bus controller illustrated in FIG. 2.

A flowchart of example advance notice operations from the perspective of bus controller 110' is illustrated in FIG. 3. Bus controller 110' may receive information in operation 300, the information including at least one packet. A header in the at least one packet may be decoded in operation 302. Decoding the header of the at least one packet may allow bus controller 110' to determine a destination device for the information in operation 304. Signal 204 may then be transmitted by advance notice circuitry 112 to the destination device in operation 306, signal 204 being configured to provide advance notice to the destination device that the information is being scheduled for transmission. Bus controller 100 may then schedule the information for transmission in operation 308, and the information may be transmitted in operation 310.

Figure 4:
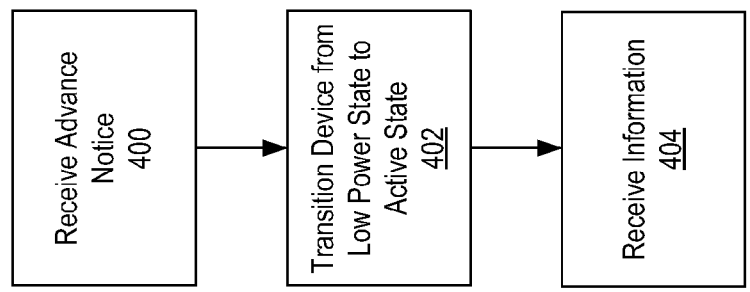
FIG. 4 is a flowchart of example advance notification operations corresponding to FIG. 3, but from the perspective of a destination device.

A flowchart of example advanced notice operations from the perspective of a destination device (e.g., at least one of devices (A-n) 116) is illustrated in FIG. 4. In operation 400 the destination device may receive a signal configured to provide advance notice to the destination device of information that will be received. The destination device may then transition from a low power operational state (e.g., a power conservation mode) to an active operational state in operation 402. The destination device may then receive the information in operation 404. Already in an active operational state, the destination device may process the information with little or no latency.

Buffer Management Circuitry and Advance Notice Circuitry

Figure 5:
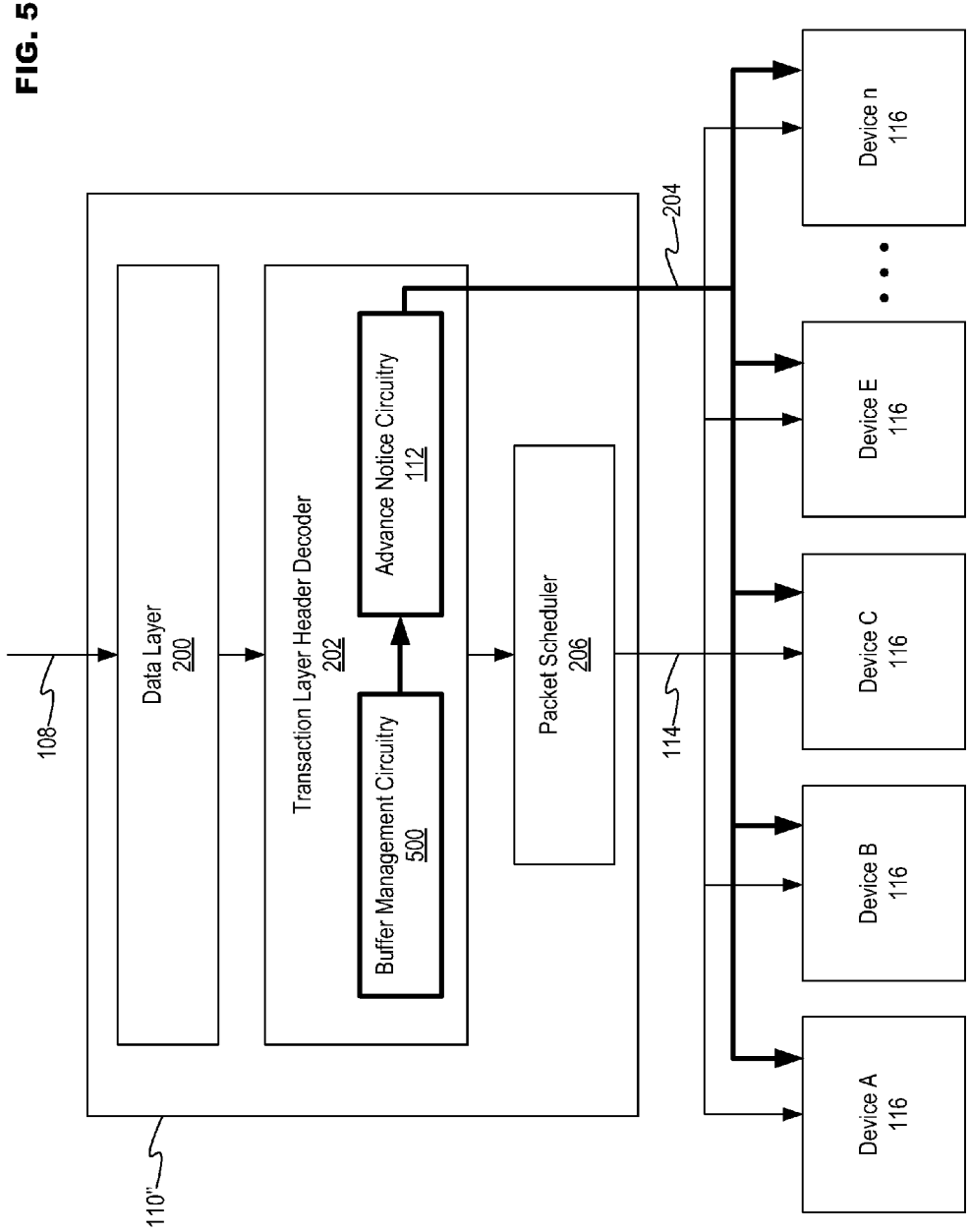
FIG. 5 illustrates an example bus controller including buffer management circuitry and advance notice circuitry in accordance with at least one embodiment.

FIG. 5 illustrates bus controller 110" including both buffer management circuitry 500 and advance notice circuitry 112 in accordance with at least one embodiment. Similar to FIG. 2, data layer 200 may receive information into bus controller 110" from bus 108, transaction layer header decoder 202 may decode a header of at least one packet in the information in order to, for example, determine a destination device for the information, and packet scheduler 206 may schedule the information for transmission via bus 114. However, buffer manager 500 is configured to provide additional functionality that allows bus controller 110" to determine whether the information received from bus 108 is ready to transmit to the destination device. For example, information received via a gigabyte Ethernet network interface may comprise many small packets received intermittently at high rates of speed. Transferring all of these small packets as received may cause devices (A-n) 116 to frequently transition from one operational mode to another, resulting in inefficient device operation. Instead, by implementing a buffer to hold these packets until a predetermined threshold is met the power efficiency of devices (A-n) 116 may be greatly improved. Buffer management circuitry 500 may be configured to store information until a predetermined threshold is met. The predetermined threshold may be based on the amount of space available in the buffer, the information being stored, the destination device, the amount of communication traffic on bus 114 being handled by bus controller 110", etc. Example predetermined thresholds may include a latency limit associated with the stored information (e.g., how long the stored information can wait before being processed), an amount of stored information, whether more information is needed to complete the stored information (e.g., whether additional inbound packets are expected related to the stored information), etc. When it is determined that the stored information is ready to transmit, buffer management circuitry 500 may cause advance notice circuitry 112 to transmit signal 204 to the destination device, signal 204 being configured to provide advance notice to the destination device that the stored information is being scheduled for transmission. The stored information may then be scheduled by bus controller 110" and transmitted to the destination device (e.g., at least one of devices (A-n) 116) via bus 114.

Figure 6:
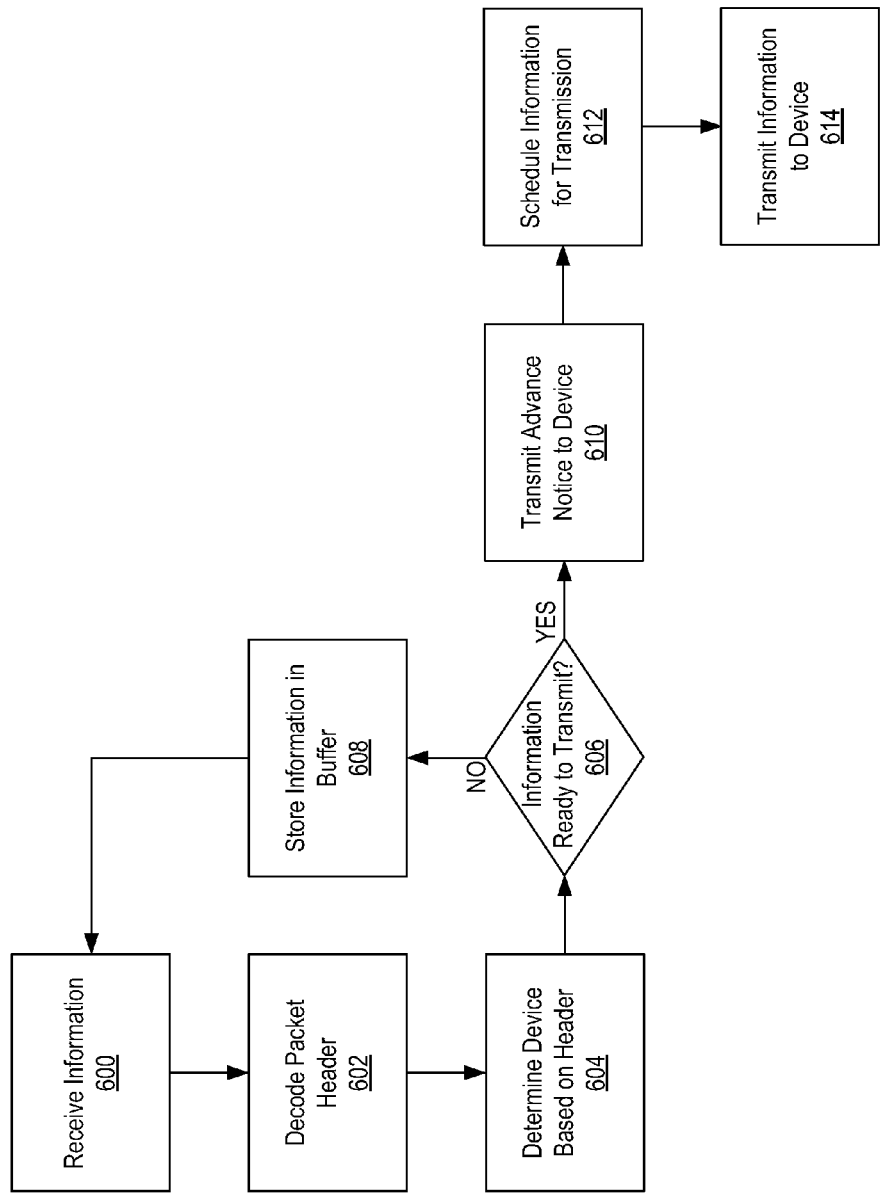
FIG. 6 is a flowchart of example advanced notification operations from the perspective of the example bus controller illustrated in FIG. 5.

A flowchart of example advance notice operations from the perspective of bus controller 110" is illustrated in FIG. 6. Bus controller 110" may receive information in operation 600. A header for at least one packet in the received information may then be decoded in operation 602 in order to, for example, determine a destination device for the information in operation 604. In operation 606 a determination may then be made as to whether the information is ready to be transmitted to the destination device (e.g., if the predetermined threshold has been met). If it is determined in operation 606 that the information is not ready to transmit, then in operation 608 the information may be stored to a buffer, and in operation 600 additional information may be received by bus controller 110". If in operation 606 it is determined that the information is ready to transmit, the process may proceed to operation 610 wherein signal 204 may be transmitted to the destination device, signal 204 being configured to provide advance notice to the destination device that the stored information is being scheduled for transmission. The stored information may then be scheduled for transmission in operation 612 and transmitted in operation 614.

Advance Notice Signaling Including Characteristic Information

In one embodiment, bus controller 110' or 110" may identify a destination device for the information and may also be able to determine characteristics corresponding to the information. Characteristics may be associated with the information itself (e.g., the size of the data) or with functionality to be performed by the destination device after receiving the information (e.g., initialization, configuration, standard operation, etc.) In one embodiment characteristics may be determined based on the header of at least one packet in the information. For example, information may be received by bus controller 110' or 110", and a header from at least one packet in the information may be decoded in order to determine a destination device for the information. In addition, during the decoding it may also be determined that the information is configuration information (e.g., configuration information for a gigabyte Ethernet device). Prior to transmission, signal 204 may be configured to inform the destination device of the determined characteristics (e.g., that the information being scheduled for transmission includes configuration information). Upon receiving signal 204, the destination device may be notified that information is incoming and may be aware of the characteristics of the information. Advance knowledge of characteristics may be beneficial in that some destination devices may only become "partially" active for certain types of information. For example, the gigabyte Ethernet device, being aware that the incoming information includes configuration information, may only transition features needed for device configuration into an active operational state. This limited transition may be quicker (reduce latency) and may also reduce the amount of power consumed by the device, which may prove beneficial at the system level where many limited transition operations can result in substantial power savings as opposed to full transitions to an active operational state.

Figure 7:
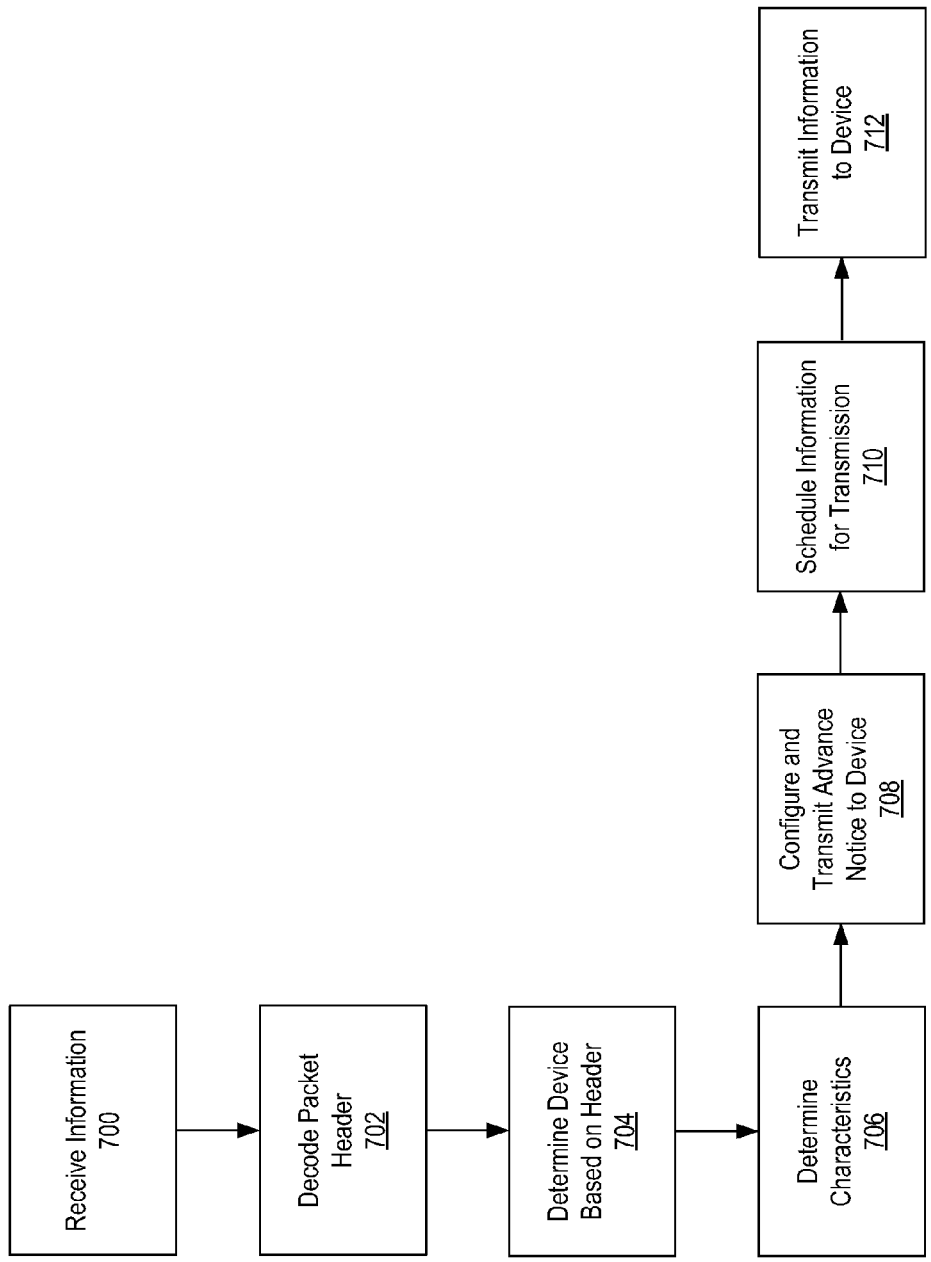
FIG. 7 is a flowchart of advanced notification operations including characteristics from the perspective of a bus controller in accordance with at least one embodiment.

A flowchart of example operations associated with providing characteristics in advance notice signals, from the perspective of a bus controller, is illustrated in FIG. 7. In operation 700, information may be received. A header from at least one packet in the information may then be decoded in operation 702, the decoded header allowing the bus controller to determine a destination device for the information in operation 704. In operation 706 a further determination of characteristics associated with the information may be made, the characteristics determination being based on, for example, the decoded header. In operation 708 signal 204 may be configured based on the characteristics, and signal 204 may be transmitted, the signal being configured to provide advance notice to the destination device that the information is being scheduled for transmission and to inform the destination device of the characteristics. The information may then be scheduled for transmission in operation 710 and may be transmitted in operation 712.

Figure 8:
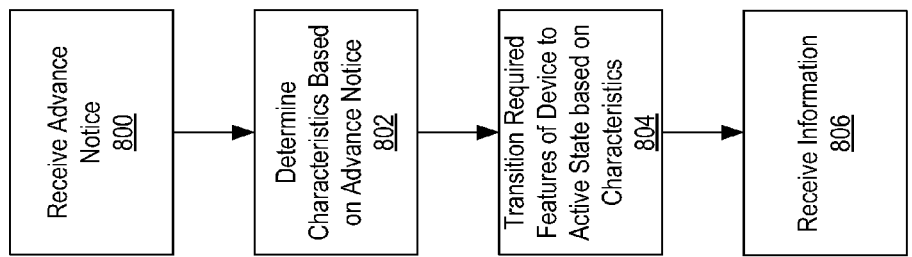
FIG. 8 is a flowchart of example advance notification operations corresponding to FIG. 7, but from the perspective of a destination device.

A flowchart of example operations associated with providing characteristics in advance notice signals, from the perspective of a destination device (e.g., at one of devices (A-n) 116) is illustrated in FIG. 8. In operation 800 a destination device may receive signal 204 configured to provide advance notice to the device of information to be received. In operation 802 the destination device may further determine characteristics associated with the information based on signal 204 received in operation 800. In operation 804 the device may transition device features required to process the information from a low power operational state to an active operational state based on the characteristics that were determined in operation 802. The transition from a low power operational state to an active operational state may involve the entire device or only a subset of features in the device needed to process the information based on the characteristics. The information may then be received by the device in operation 806.

While the foregoing detailed description provides specific examples of controlling device operation with advanced notice signaling specifically in connection with a bus controller, it will be recognized that the teachings of the present disclosure are not limited only to bus controller applications. In other embodiments, advance notice signaling may be performed between any two devices that are communicating on wired or wireless communication bus. For example, a memory device (e.g., a register) may employ advance notice signaling to inform a processor as to whether there is information in the register to process. If no further information remains to be processed, the processor may save its current context and enter a low power mode. When the register again contains information for the processor, the register or another device may transmit advanced notice signaling to the processor, causing it to reload the previous context and prepare to receive additional information. In another example, advance notice signaling may be used to provide a memory controller with addresses of future transactions so that the memory controller's page open/close policy may be optimized to prevent a page from being closed prior to receiving a packet to an address in the open page, to open a page prior to the arrival of a transaction, etc.

While FIG. 3-4 and FIG. 6-8 illustrate various operations according to several embodiments, it is to be understood that not all of the operations depicted in FIG. 3-4 and FIG. 6-8 are necessary for other embodiments. Indeed, it is fully contemplated herein that in other embodiments of the present disclosure, the operations depicted in FIG. FIG. 3-4 and FIG. 6-8 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

Thus, the present disclosure provides methods and systems for controlling device operation in a processing system. Information comprising at least one packet may be received in a bus controller, and a header in the at least one packet may be decoded in order to determine a destination device for the information. A signal may then be transmitted to the destination device, the signal being configured to provide advance notice to the destination device that the information is being scheduled for transmission. It may also be possible for the information to be stored until the bus controller determines it is ready for transmission, and in addition, for characteristics of the information to be conveyed in the signal to further inform the destination device about the information.

According to another aspect there is provided a system. The system may include a communication module configured to transmit and receive information and signals, and one or more storage mediums. The one or more storage mediums having stored thereon, individually or in combination, instructions that when executed by one or more processors result in the following operations comprising receiving information comprising at least one packet, identifying the information as associated with a device based on a header in the at least packet and transmitting a signal to the device, the signal being configured to provide advance notice to the device that the information is being scheduled for transmission to the device.

According to another aspect there is provided a system. The system may include a communication module configured to at least receive signals and information, and one or more storage mediums. The one or more storage mediums having stored thereon, individually or in combination, instructions that when executed by one or more processors result in the following operations comprising receiving a signal configured to provide advance notice of information that will be received, transitioning from a first operational state to a second operational state and receiving the information.

According to another aspect there is provided a system. The system may include one or more storage mediums having stored thereon, individually or in combination, instructions that when executed by one or more processors result in the following operations comprising receiving information comprising at least one packet, identifying the information as associated with a device based on a header in the at least one packet and transmitting a signal to the device, the signal being configured to provide advance notice to the device that the information is being scheduled for transmission to the device.

According to another aspect there is provided a system. The system may include one or more storage mediums having stored thereon, individually or in combination, instructions that when executed by one or more processors result in the following operations comprising receiving a signal configured to provide advance notice of information that will be received, transitioning from a first operational state to a second operational state and receiving the information.

According to one aspect there is provided a method. The method may include receiving information comprising at least one packet, identifying the information as associated with a device based on a header in the at least one packet and transmitting a signal to the device, the signal being configured to provide advance notice to the device that the information is being scheduled for transmission to the device.

According to one aspect there is provided a method. The method may include receiving a signal configured to provide advance notice of information that will be received, transitioning from a first operational state to a second operational state and receiving the information.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system, comprising:
    a communication module configured to transmit and receive information and signals; and
    one or more storage mediums having stored thereon, individually or in combination, instructions that when executed by one or more processors result in the following operations comprising:
    receiving information comprising at least one packet;
    identifying the information as associated with a device based on a header in the at least one packet;
    identifying characteristics associated with the information, the characteristics including at least one of a plurality of functionalities to be performed by the device after receiving the information;
    configuring a signal based on the identified characteristics;
    transmitting the signal to the device, the signal being configured to provide advance notice to the device that the information is being scheduled for transmission to the device and the at least one of the plurality of functionalities to be performed by the device after receiving the information; and
    after transmitting the signal to the device, transmitting the information to the device.

2. The system of claim 1, wherein the signal is further configured for transmission over a peripheral component interconnect express (PCIE) bus.

3. The system of claim 1 further comprising a buffer, wherein the instructions that when executed by one or more processors result in the following additional operations:
    storing the information in the buffer until a predetermined threshold is met; and
    transmitting the signal after the predetermined threshold has been met.

4. The system of claim 3, wherein the predetermined threshold is at least one of a latency limit associated with the information, an amount of information, or completeness of the information.

5. The system of claim 1, wherein the characteristics are associated with the one of the plurality of functionalities to be performed by the device after receiving the information.

6. The system of claim 1, wherein the instructions that when executed by one or more processors result in the following operations:
    scheduling the information for transmission to the device; and
    after transmitting the signal to the device, transmitting the information to the device.

7. The system of claim 1, wherein the characteristics are identified based on the header.

8. A system, comprising:
    a communication module of a device configured to at least receive signals and information; and
    one or more storage mediums having stored thereon, individually or in combination, instructions that when executed by one or more processors result in the following operations comprising:
    receiving a signal at the device configured to provide advance notice of information that will be received;
    determining characteristics based on the signal, the characteristics being associated with at least one of a plurality of functionalities to be performed by the device after receiving the information;
    transitioning the device from a first operational state to a second operational state based on the characteristics; and
    after receiving the signal at the device, receiving the information at the device.

9. The system of claim 8, wherein the first operational state is a low power state and the second operational state is an active state.

10. The system of claim 8, wherein the first operational state is a low power state and the second operational state is a partially active state based on the characteristics.

11. A system comprising one or more storage mediums having stored thereon, individually or in combination, instructions that when executed by one or more processors result in the following operations comprising:
    receiving information comprising at least one packet;
    identifying the information as associated with a device based on a header in the at least one packet;
    identifying characteristics associated with the information, the characteristics including at least one of a plurality of functionalities to be performed by the device after receiving the information;
    configuring a signal based on the identified characteristics;
    transmitting the signal to the device, the signal being configured to provide advance notice to the device that the information is being scheduled for transmission to the device and the at least one of the plurality of functionalities to be performed by the device after receiving the information; and
    after transmitting the signal to the device, transmitting the information to the device.

12. The system of claim 11, wherein the signal is further configured for transmission over a peripheral component interconnect express (PCIE) bus.

13. The system of claim 11 further comprising a buffer, wherein the instructions that when executed by one or more processors result in the following additional operations:
storing the information in the buffer until a predetermined threshold is met; and
transmitting the signal after the predetermined threshold has been met.

14. The system of claim 13, wherein the predetermined threshold is at least one of a latency limit associated with the information, an amount of information, or completeness of the information.

15. The system of claim 11, wherein the characteristics are associated with the one of the plurality of functionalities to be performed by the device after receiving the information.

16. The system of claim 11, wherein the instructions that when executed by one or more processors result in the following operations:
scheduling the information for transmission to the device; and
after transmitting the signal to the device, transmitting the information to the device.

17. The system of claim 11, wherein the characteristics are identified based on the header.

18. A system comprising one or more storage mediums having stored thereon, individually or in combination, instructions that when executed by one or more processors result in the following operations comprising:
receiving a signal at a device configured to provide advance notice of information that will be received;
determining characteristics based on the signal, the characteristics being associated with at least one of a plurality of functionalities to be performed by the device after receiving the information;
transitioning the device from a first operational state to a second operational state based on the characteristics; and
after receiving the signal at the device, receiving the information at the device.

19. The system of claim 18, wherein the first operational state is a low power state and the second operational state is an active state.

20. The system of claim 18, wherein the first operational state is a low power state and the second operational state is a partially active state based on the characteristics.

21. A method, comprising:
receiving information comprising at least one packet;
identifying the information as associated with a device based on a header in the at least one packet;
identifying characteristics associated with the information, the characteristics including at least one of a plurality of functionalities to be performed by the device after receiving the information;
configuring a signal based on the identified characteristics;
transmitting the signal to the device, the signal being configured to provide advance notice to the device that the information is being scheduled for transmission to the device and the at least one of the plurality of functionalities to be performed by the device after receiving the information; and
after transmitting the signal to the device, transmitting the information to the device.

22. The method of claim 21, wherein the signal is further configured for transmission over a peripheral component interconnect express (PCIE) bus.

23. The method of claim 21, further comprising:
storing the information in a buffer until a predetermined threshold is met; and
transmitting the signal after the predetermined threshold has been met.

24. The method of claim 23, wherein the predetermined threshold is at least one of a latency limit associated with the information, an amount of information, or completeness of the information.

25. The method of claim 21, wherein the characteristics are associated with the one of the plurality of functionalities to be performed by the device after receiving the information.

26. The method of claim 21, further comprising:
scheduling the information for transmission to the device; and
after transmitting the signal to the device, transmitting the information to the device.

27. The method of claim 21, wherein the characteristics are identified based on the header.

28. A method, comprising:
receiving a signal at a device configured to provide advance notice of information that will be received;
determining characteristics based on the signal, the characteristics being associated with at least one of a plurality of functionalities to be performed by the device after receiving the information;
transitioning the device from a first operational state to a second operational state based on the characteristics; and
after receiving the signal at the device, receiving the information at the device.

29. The method of claim 28, wherein the first operational state is a low power state and the second operational state is an active state.

30. The method of claim 28, wherein the first operational state is a low power state and the second operational state is a partially active state based on the characteristics.

* * * * *